Jan. 20, 1959

R. H. COOPER ET AL 2,869,195

SHELL MOLDING COMPOSITION CONTAINING FATTY
ALKYLOL AMIDE CONDENSATE, INERT FILLER AND
A PHENOLIC RESIN AND METHOD OF MAKING MOLD

Filed Sept. 26, 1956

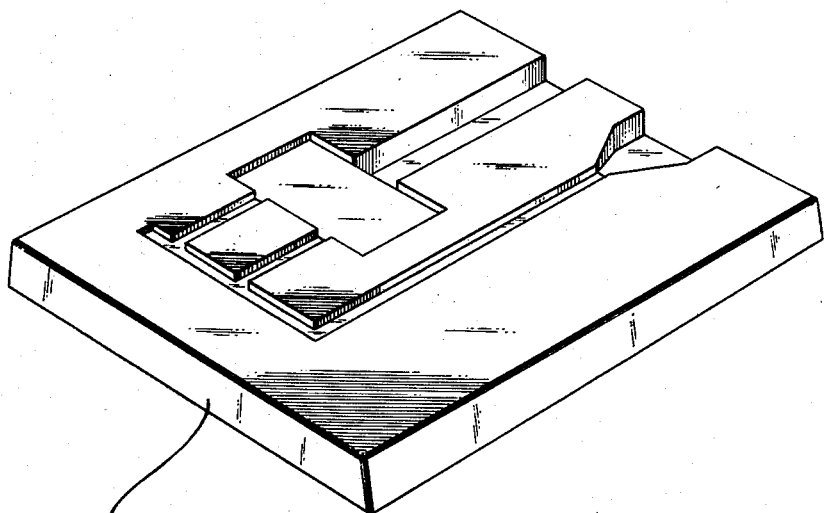

Shell mold fabricated from composition
containing fatty amide surfactant
material with phenolic resin binder and
inert filler material.

INVENTORS.
Ronald H. Cooper
James A. Kelly

BY

Griswold & Burdick
ATTORNEYS

2,869,195

SHELL MOLDING COMPOSITION CONTAINING FATTY ALKYLOL AMIDE CONDENSATE, INERT FILLER AND A PHENOLIC RESIN AND METHOD OF MAKING MOLD

Ronald H. Cooper, Clare, and James A. Kelly, Midland, Mich., assignors to The Dow Chemical Company, Midland, Mich., a corporation of Delaware Application September 26, 1956, Serial No. 612,285

11 Claims. (Cl. 22—193)

This invention relates to improved coated sand compositions that are especially well suited for the fabrication of strong shell mold structures and the like. It also has reference to the provision of shell molds and like structures from such compositions.

Shell molding techniques represent a relatively recent development that is finding increasing favor for employment in foundry practice for metal casting operations. Most resin-bonded shell molds may be fabricated in a manner similar to that which is utilized in the so-called Croning process which has been described in F. I. A. T. Final Report No. 1168 (dated May 30, 1947) by the Field Information Agency, Technical, United States Department of Commerce. In shell molding, rigid, thin-walled molds comprised of a thermoset resin-bonded mixture of sand or other fine grained refractory material are employed to hold the molten metal which is desired to be cast. The resin bonded sand molds are ordinarily prepared by permitting a free-flowing granular mixture of sand and a suitable thermoplastic and thermosetting resin to come in contact with a metal pattern, usually under the influence of heat for a sufficient period of time and, in some cases, under an applied pressure, to the pattern and form a reproduction thereof while the resin is in a thermoplastic temperature range or while the composition is in an otherwise plastic and formable condition. The sand molds are then thermoset to form the desired strong and rigid structures having high gas permeability, good surface smoothness and exceptional dimensional stability.

Such mold forms, in which either ferrous or non-ferrous metals may be cast, frequently permit better castings to be obtained than by conventional methods due to their more porous structure and more precise surface finishes than ordinary sand molds. In addition, they oftentimes result in a more economical foundry practice than may be achieved with conventional sand molds, since they require less sand than the usual green sand molds and can be fabricated with very small quantities of relatively inexpensive resin binders. Furthermore, they are lighter and less cumbersome and awkward to handle or manipulate than the traditional sand molds and eliminate much of the hazard and unpleasantness due to dust and powder that obtains in the practice of the old technique.

It would be highly advantageous to provide an improved coated sand composition that would be particularly adapted to be fabricated into strong shell mold and the like structures.

This result and other advantages and benefits may be achieved with a composition in accordance with the present invention which is comprised of a preponderant proportion of sand or an equivalent refractory material in discrete particle form; a binding quantity of an aqueous phenolic liquid resin binder catalyzed with an active powdered magnesium oxide; and a small quantity of surface active fatty amide material. Advantageously, the compositions are comprised of the sand with between about 3 and 10 percent by weight, based on the weight of the composition, of the phenolic liquid resin which contains between about 10 and 25 percent by weight, based on the weight of the resin in the composition, of the powdered magnesium oxide catalyst and between about 2 and 25 percent by weight based on the weight of the resin in the composition of the surface active fatty amide material. The magnesium oxide catalyzed phenolic liquid resin is capable of being applied as a liquid coating on the sand and subsequently self-setting or auto-hardening to a thermoplastic-thermosetting mass. The surface active fatty amide material improves the initial strength and toughness characteristics of the wet mix auto-hardened structures that are formed from the compositions to a considerable degree over similar compositions prepared without the benefit of such ingredient.

The wet coated compositions, before the applied resin coating has set or auto-hardened, is a plastic, flowable mass that may be worked and agglomerated to any desired shape. As such, it may be formed into shell molds or similar structures as a wet, plastic mixture according to conventional practices, such as by dump-box techniques. Thus, the wet mixture may be brought in contact with a desired pattern and pressed thereupon, usually under a pressure in the range from 80 to 100 pounds per square inch (gauge) for a sufficient period of time, usually within an hour, to initially form the desired shell mold form as an integral structure while the catalyzed resin binder coated on the sand is auto-hardening to a thermoplastic-thermosetting mass capable of coherently retaining the wet pressed mixture in the desired shape. Alternatively, the wet mixture may be distributed on the pattern with the assistance of pneumatic pressure, much in the manner of conventional foundry core blowing practice, to initially form the desired shell mold. The shell mold form may then be cured or thermoset to a rigid form suitable for use in shell molding. Ordinarily, thermosetting temperatures between about 250 and 600° F. or higher may be employed, depending on the contact time that is utilized during curing. Frequently, the shell mold form may be satisfactorily cured or thermoset at a temperature of about 475–500° F. for periods of at least 45 to 60 minutes.

Any ordinary sand or other refractory material in discrete particle form may be employed in the practice of the present invention. Advantageously, the sand or its equivalent that is employed has a fineness in accordance with the values proposed by the American Foundryman's Society (AFS) that is in the numerical range between about 25 and 180. Such sands, for example, as the types which are known as Berkeley Float Sand, Juniata Sand, Lake Sand, Vassar Sand, Wedron Sand and the like may be beneficially employed. It is desirable that the sand be clean and substantially free from foreign metal oxides, clay, moisture and organic matter. In many cases, it may be more advantageous to employ a sand having an AFS fineness number from about 50 to 125. Very frequently, sands that have an AFS fineness number in the neighborhood of 100 may be preferable.

Advantageously, the resin binder that is employed in the compositions of the present invention is a self-hardening liquid mixture of an aqueous phenolic liquid resin such as a phenol-formaldehyde liquid resin and a powdered magnesium oxide catalyst that is capable of dehydrating and auto-hardening the liquid resin at room temperatures to a dry thermoplastic-thermosetting mass. Such a resin binder for inert filler materials is described in the copending application of Ronald H. Cooper covering Improved Phenolic Resin Compositions having Serial No. 612,283 that was concurrently filed on September 26, 1956. Thus, the phenolic liquid resin that is employed may be a phenol-formaldehyde condensation product of the type that is oftentimes characterized as being a Stage "A" resin that has been prepared by reacting aqueous mixtures of phenol and formaldehyde, in a known manner, under the influence of basic catalysis. Ordinarily, such liquid resins have a greater than 1:1 mole ratio of formaldehyde to phenol in their composition. It may frequently be desirable for a phenol-formaldehyde liquid resin to be employed that has a mole ratio of formaldehyde to phenol in the neighborhood of 1.45:1 with a solids content of at least 50 to 70 percent by weight, a viscosity from about 100 to 1,000 centipoises at 77° F. and a pH from about 5 to 9. The magnesium oxide catalyst that is incorporated in such a phenolic liquid resin to achieve its auto-hardening properties may be a finely divided powder that has initial setting characteristics, measured as a function of time according to the procedure set forth in A. S. T. M. Specification No. C254–50T, that is between about 0.1 and 6 hours.

The time that is required for a phenolic liquid resin of the indicated type to self-set due to the effect of the included powdered magnesium oxide powder depends to a great extent upon the activity or initial setting time characteristics of the magnesium oxide powder and the proportion in which it is included with the phenolic liquid resin in the binder. This, of course, limits the time in which a composition prepared with such a liquid resin binder is plastic and flowable so that it may be cold formed to a shell mold pattern as a wet mixture after its initial preparation. Such phenomena is illustrated in the following Table 1, wherein the auto-hardening times of quantitatively equivalent coated sand compositions utilizing a magnesium oxide catalyzed phenolic liquid resin binder are set forth. Each of the tested compositions in Table 1 contained about 92.5 percent by weight of ordinary AFS 100 sand that had been uniformly coated with a mixture of about 1.5 percent by weight of the catalyst and about 6 percent by weight of a liquid phenol-formaldehyde resin containing about 70 percent by weight of solids in which the ratio of formaldehyde to phenol was about 1.45:1, and which had a pH of about 5 and a viscosity, at 77° F., of about 500 centipoises.

Table 1.—Self-setting time of various coated sands as affected by initial setting time of magnesium oxide catalyst in resin binder

| Composition | Initial Setting Time of MgO, Hours | Self-Setting Time of Composition |
| --- | --- | --- |
| A | 0.1 | 10–12 minutes. |
| B | 0.5 | 12–15 minutes. |
| C | 1 | 45 minutes. |
| D | 3 | 6 hours. |
| E | 4 | 10–12 hours. |
| F | 6 | 24 hours. |

The self-setting characteristics of a magnesium oxide catalyzed phenolic liquid resin coating on the sand are also influenced by the relative quantity of the catalyst that is present therein. Greater quantities of included catalyst generally shorten the initial self-setting time of the coating. A greater quantity of the catalyst also tends to alter the thermoplastic characteristics of the coated sand compositions after the resin coating has initially auto-hardened by raising the softening or melting point of the coating. This is illustrated in the following Table 2, wherein the proportions of various magnesium oxide catalysts were varied in several compositions with a phenolic liquid resin (similar to that utilized for deriving the data presented in Table 1) to determine the effect on the auto-hardening time at room temperature of the compositions.

Table 2.—Auto-hardening time of compositions containing varied proportions of magnesium oxide catalyst

| Composition | G | H | J | K |
| --- | --- | --- | --- | --- |
| Percent by Weight of Liquid Resin In Composition | 94.40 | 88.90 | 77.80 | 64.00 |
| Percent by Weight of MgO Catalyst In Composition | 5.60 | 11.10 | 22.20 | 36.00 |
| Percent By Weight of Catalyst In Composition Based On Resin | 5.94 | 12.00 | 28.50 | 56.20 |
| Working Or Mixing Time Permissible With Composition Formulated With ½ Hour MgO Catalyst, Minutes | 30 | 20 | 10 | 5 |
| Same With Equivalent Composition Using 6 Hours MgO Catalyst | 90 | 45 | 30 | 15 |
| Total Auto-Hardening Time of Composition Formulated With ½ Hour MgO Catalyst, Minutes | 144 | 48 | 18 | 8 |
| Same With Equivalent Composition Using 6 Hours MgO Catalyst | 160 | 72 | 24 | 12 |
| Melting or Softening Point in °F. of Auto-Hardened Composition | 150 | 230 | 392 | greater than 480 |

Generally between about 10 and 25 percent by weight of magnesium oxide, based on the liquid resin content in the binder, is a suitable proportion to employ as a catalyst for aqueous phenolic liquid resins intended for application as organic resin binders in the practice of the present invention. Advantageously, the powdered magnesium oxide that is employed has an initial setting time between about 0.5 and 3 hours and is so finely divided that its average particle size is finer than about 40 mesh in the U. S. Sieve Series. Preferably, the aqueous liquid phenol-formaldehyde resin that is magnesium oxide catalyzed for utilization as a thermoplastic-thermosetting resin binder in the practice of the invention has a solids content in the aqueous vehicle of about 50 to 70 percent by weight, a pH between about 5 and 8 and a viscosity at 77° F. of between about 300 and 500 centipoises.

As has been indicated, the utilization of magnesium oxide catalyzed phenolic liquid resins as binder materials in the practice of the present invention advantageously permits the shell mold fabricating compositions to be initially cold formed as a plastic and flowable wet mixture by a cold production technique which does not necessitate the employment of heat or solvents in either the formulation of the coated sand compositions or the initial formation of the shell mold reproduction of a desired pattern. This benefit, as has been indicated, stems from the ability of magnesium oxide catalyzed phenolic resin compositions to auto harden at room temperatures. In so doing they may form an agglomerated, coherent mass, as when the sand composition is being pressed against the desired pattern to cold form a shell mold, that may subsequently be thermoset to a rigid structure. Or they may form a dry, free-flowing granular composition, especially if they are efficiently mulled or mixed during the auto-hardening of the applied liquid resin coating to prevent agglomeration of the coated sand.

It is essential in the practice of the present invention to achieve a uniform and thorough dispersion and mixing of all the ingredients of the composition and to homogeneously blend the resin binder with the sand. It is usually advantageous to prepare the composition by premixing the powdered magnesium oxide with the sand before thoroughly interblending and mixing the phenolic liquid resin with thus preliminarily prepared ingredients.

The surface active fatty amide material that is employed may be advantageously be a nonionic fatty alkylol amide condensate type of surfactant material such as that which is available under the trade-designation "Alrosol–O" from the Geigy Chemical Company. Other surface active fatty amide materials of this nature that may be employed satisfactorily include those materials which are also available from the Geigy Chemical Company under the trade-designations "Alrosol–C," "Alrosol–CS," "Alrosol–B," "Alrosol–H," and "Alrosol–S." The fatty amide surfactant can be dispersed readily in the phenolic liquid resin in the preparation of the compositions of the invention.

The various "Alrosol" products are non-ionic surfactants prepared by reacting approximately one mole of a fatty acid with 2 moles of diethanol amine to obtain a condensation product according to the equation:

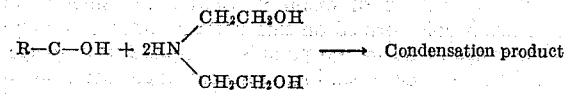

The reacted products are a complex mixture of free diethanol amine, fatty acid-alkanol amine salt, fatty acid amide, and a fatty acid-amine condensation product. The main difference in the products is in the equivalent weight of the fatty acid employed for preparation of the surface active condensate. In the various "Alrosol" products mentioned in the foregoing, the fatty acids used in the reaction are those in which R in the above equation is an aliphatic radical of from about 9 to about 17 carbon atoms so that the fatty acids themselves contain between about 10 and about 18 carbon atoms in their molecules (including the carbon atom in the carboxyl group). Thus, "Alrosol-O" and "Alrosol-H" are the condensation product of about one mole of oleic acid with about 2 moles of diethanol amine. "Alrosol CS" is similarly prepared with myristic acid; "Alrosol-B" with palmitic acid; "Alrosol-C" with capric acid; and "Alrosol-S" with stearic acid. Therefore, as is apparent, the non-ionic fatty alkylol amide condensate type of surfactant materials employed in the practice of the present invention are derived from fatty acids containing between about 10 and about 18 carbon atoms.

As mentioned, the presence of the fatty amide surfactant, which exerts a preferential wetting action on the filler material, causes a substantial increase in the strength of the wet formed auto-hardened composition fabricated from the compositions of the invention in comparison with equivalent compositions prepared without inclusion of the fatty amide surfactant. Frequently, for example wet-formed and auto hardened compositions, after having been thermoset, may be found to have tensile strengths in the neighborhood of 1,000 pounds per square inch. In comparison, similar compositions that have been prepared with the same liquid binder but without incorporating the fatty amide surfactant therein may have tensile strengths before being thermoset that are only about half as great. Care should be taken in the employment of the surface active fatty amide material that too great a quantity is not used. Excessive amounts of the surfactant in the composition may tend to weaken the binding effect of the phenolic resin binder and may prolong the auto-hardening period of the composition to undesirably lengthy periods.

The invention is further illustrated in and by the following example wherein, unless otherwise indicated, all parts and percentages are to be taken by weight.

EXAMPLE

A composition comprising about 95.00 parts of Vassar AFS 100 sand, 0.57 part of "Alrosol-O" surface active fatty amide (the condensation product of about 1 mole of oleic acid with about 2 moles of diethanol amine), 4.00 parts of an aqueous liquid phenolic resin and 0.43 part of ½ hour powdered magnesium oxide was prepared for fabrication into shell molds in accordance with the present invention. The phenolic liquid resin was a phenolformaldehyde condensation product that had a formaldehyde to phenol mole ration of about 1.45:1, a solids content of about 70 percent, a pH of about 5 and a viscosity at 77° F. of about 500 centipoises. The composition was formulated by thoroughly premixing the magnesium oxide powder with the sand and intimately dispersing the surface active fatty amide material in the liquid resin before homogenously blending the separate ingredients to form a plastic flowable wet mixture. The wet mixture, before the applied resin had auto-hardened, was cold formed into shell mold forms by pressing it against a pattern under a pressure of about 80 pounds per square inch (gauge) while the resin binder was auto-hardening during a one hour period. After being cold set the coherent shell mold forms were cured by being thermoset at a temperature of about 482° F. for periods of time of at least 45 to 60 minutes.

The resulting shell molds were of exceptionally good quality and had tensile strengths in the neighborhood of 1,000 pounds per square inch. They were used successfully to cast grey iron with excellent results. The shell molded castings were precisely formed and had good surface finishes.

It is to be appreciated that, within the comprehension of the present invention, other desired refractory structures besides shell molds and the like may be fabricated from the compositions and in accordance with the invention.

Certain changes and modifications can be entered into readily in the practice of the present invention without substantially departing from its intended spirit and scope. Therefore, it is to be fully understood that the invention is not to be limited or otherwise restricted to or by the foregoing illustrative description and specification. Rather, it is to be interpreted and construed in the light of what is set forth and defined in the hereto appended claims.

What is claimed is:

1. Composition for the fabrication of shell molds and the like structures which comprises a preponderant proportion of sand; a binding minor quality in excess of about 3 percent by weight, based on the weight of the composition, of an aqueous phenol liquid resin binder which is a phenol-formaldehyde condensation product that has a greater than 1:1 mole ratio of formaldehyde to phenol, respectively, a solids content of at least about 50 percent by weight, a pH between 5 and 9 and a viscosity at 77° F. between about 100 and 1000 centipoises, said resin binder being catalyzed with an active powdered magnesium oxide that has an initial setting time of less than about 6 hours in an amount in said composition between about 10 and 25 percent by weight, based on the weight of the resin in the composition, and a quantity between about 2 and 25 percent by weight, based on the weight of the resin in the composition, of a non-ionic fatty alkylol amide condensate surface active material that is the condensation product of about one mole of a fatty acid containing from about 10 to about 18 carbon atoms in its molecule with about two moles of diethanol amine, said condensation product being a complex mixture of free diethanol amine, fatty acid-alkanol amine salt, fatty acid amide, and fatty acid-amine condensate.

2. The composition of claim 1 wherein the resin binder is provided as a coating on the sand granules and in which resin binder the surface active fatty amide material is thoroughly dispersed.

3. The composition of claim 1 in the form of a wet, plastic and flowable mixture.

4. The composition of claim 1 wherein the sand has an AFS fineness number between about 25 and 180.

5. The composition of claim 1 wherein the active powdered magnesium oxide has an initial setting time between about ½ and 3 hours.

6. A shell mold fabricated from a composition in accordance with claim 1.

7. The composition of claim 1, wherein said non-ionic fatty alkylol amide condensate surface active material is the condensation product of about one mole of oleic acid with about 2 moles of diethanol amine.

8. The composition of claim 1 containing between about 3 and 10 percent by weight, based on the weight of the composition, of said aqueous phenol liquid resin binder.

9. Method for fabricating shell molds and like structures which comprises preparing a wet, plastic and flowable mixture of a composition consisting of a preponderant proportion of sand; a binding minor quantity in excess of about 3 percent by weight, based on the weight of the composition, of an aqueous phenolic liquid resin binder which is a phenol-formaldehyde condensation product that has a greater than 1:1 mole ratio of formaldehyde to phenol, respectively, a solids content of at least about 50 percent by weight, a pH between 5 and 9 and a viscosity at 77° F. between about 100 and 1,000 centipoises, said resin binder being catalyzed with an active powdered magnesium oxide in an amount between about 10 and 25 percent by weight, based on the weight of the resin in the composition, said magnesium oxide having an initial setting time of less than about 6 hours; and a small quantity that is between about 2 and 25 percent by weight, based on the weight of the resin in the composition, of a non-ionic fatty alkylol amide condensate surface active material that is the condensation product of about one mole of a fatty acid containing from about 10 to about 18 carbon atoms in its molecule with about two moles of diethanol amine, said condensation product being a complex mixture of free diethanol amine, fatty acid-alkanol amine salt, fatty acid amide, and fatty acid-amine condensate; cold forming a shell mold structure with said wet mixture while it is in a plastic and flowable condition by placing it in forming contact with a pattern; permitting said mixture to autoharden to an integral shape while in contact with said pattern; and subsequently curing the formed shell mold structure of said composition at a thermosetting temperature to a rigid structure.

10. The method of claim 9 wherein the shell mold structure is cold formed on said pattern under a pressure in the range of 80 to 100 pounds per square inch, gauge, and wherein the resulting, auto-hardened shell mold structure is cured at a temperature between about 250 and 600° F. for a sufficient period of time to thermoset the resin binder.

11. The method of claim 9, wherein said non-ionic fatty alkylol amide condensate surface active material is the condensation product of about one mole of oleic acid with about 2 moles of diethanol amine.

References Cited in the file of this patent

UNITED STATES PATENTS 2,662,067   Less et al. _____ Dec. 8, 1953

FOREIGN PATENTS 305,237   Great Britain _____ May 2, 1930